United States Patent
Newman

(10) Patent No.: US 8,244,448 B2
(45) Date of Patent: Aug. 14, 2012

(54) VEHICLE HAVING REMOTE START AND GARAGE DOOR CONTROL

(75) Inventor: Kevin L. Newman, Farmington Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 643 days.

(21) Appl. No.: 12/535,239

(22) Filed: Aug. 4, 2009

(65) Prior Publication Data

US 2011/0030638 A1    Feb. 10, 2011

(51) Int. Cl.
*F02N 11/10* (2006.01)
(52) U.S. Cl. ..... 701/107; 701/112; 701/113; 123/179.2; 123/179.4; 340/5.71
(58) Field of Classification Search .................. 701/102, 701/107, 112, 113; 123/179.2, 179.3, 179.4; 340/5.71, 5.72
See application file for complete search history.

(56) References Cited

U.S. PATENT DOCUMENTS

| | | | | |
|---|---|---|---|---|
| 3,124,118 | A | * | 3/1964 | Sibert ........................ 123/179.2 |
| 5,942,988 | A | * | 8/1999 | Snyder et al. .............. 340/12.22 |
| 6,983,726 | B1 | | 1/2006 | Luo et al. |
| 7,167,791 | B2 | | 1/2007 | Kappauf et al. |
| 7,342,368 | B2 | | 3/2008 | Roman |
| 7,474,943 | B2 | | 1/2009 | Matsubara et al. |

* cited by examiner

*Primary Examiner* — Hai Huynh
(74) *Attorney, Agent, or Firm* — Frank A. MacKenzie; MacMillan, Sobanski & Todd, LLC

(57) ABSTRACT

The subject of the present invention is a method for remote starting an internal combustion engine of a vehicle. The method includes detecting a wireless remote start signal; after detecting the wireless remote start signal, communicating with a garage door opener to determine if a garage door is closed; remote starting the engine if no closed garage door indication is received; transmitting a wireless garage door open signal and remote starting the engine if a closed garage door indication is received; monitoring a time since remote starting the engine; monitoring for vehicle operator interaction with the vehicle; and if no vehicle operator interaction with the vehicle is detected before the monitored time reaches a predetermined amount of time and the wireless garage door open signal was transmitted when the engine was remote started, automatically transmitting a wireless garage door close signal and automatically turning off the engine.

4 Claims, 2 Drawing Sheets

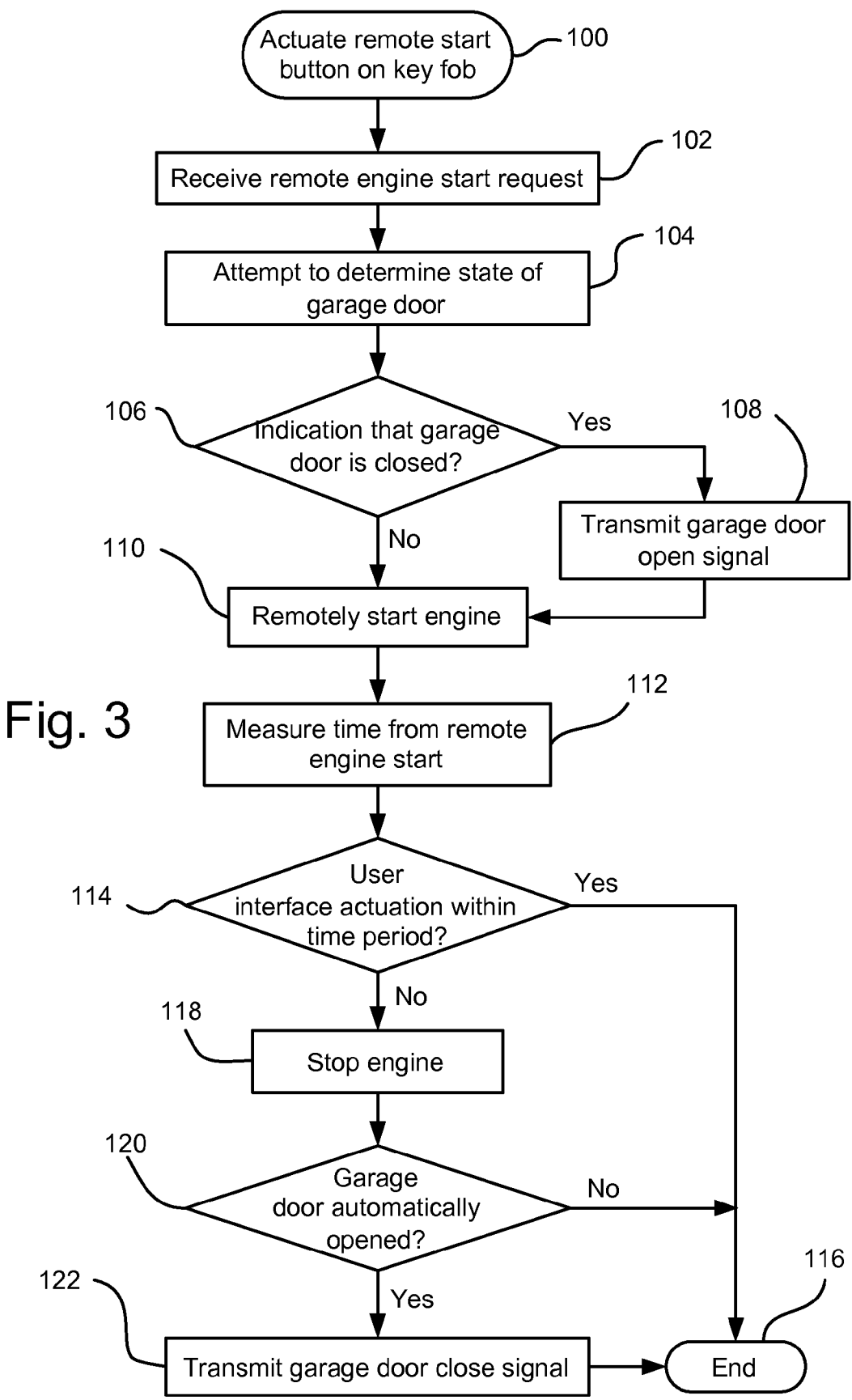

VEHICLE HAVING REMOTE START AND GARAGE DOOR CONTROL

BACKGROUND OF THE INVENTION

The present invention relates generally to vehicles having remote start (remote engine start) capabilities, and more particularly to vehicles having remote start capabilities with automatic control of a garage door.

Vehicle technologies exist that allow for remote starting of vehicles. For example, a key fob may include a button that, when pushed, transmits a signal to the vehicle causing the internal combustion engine to start. Vehicle operators find this feature handy because a heater or air conditioner can be activated with the engine in order to heat or cool the vehicle before the operator enters the vehicle.

One concern with remote start, however, is that the vehicle may be parked in a garage with the garage door closed or other enclosed space when the remote start signal is sent. Moreover, since the remote start button is on a key fob with the vehicle operator, the operator may not realize that the vehicle is in the enclosed space (such as a garage with the door closed) when activating the remote start function. Because internal combustion engines produce exhaust gasses that are undesirable for humans to breathe, it is undesirable for vehicle engines to run while the vehicle is parked in a closed garage or other space where exhaust gasses can build up rather than escape to atmosphere.

SUMMARY OF THE INVENTION

An embodiment contemplates a method for remote starting an internal combustion engine of a vehicle comprising the steps of: detecting a wireless remote start signal; after detecting the wireless remote start signal, communicating with a garage door opener to determine if a garage door is closed; remote starting the internal combustion engine if no closed garage door indication is received; automatically transmitting a wireless garage door open signal and remote starting the internal combustion engine if a closed garage door indication is received; monitoring a time since remote starting the internal combustion engine; monitoring for vehicle operator interaction with the vehicle; and if no vehicle operator interaction with the vehicle is detected before the monitored time reaches a predetermined amount of time and the wireless garage door open signal was automatically transmitted when the internal combustion engine was remote started, automatically transmitting a wireless garage door close signal and automatically turning off the internal combustion engine.

An advantage of an embodiment is the reduced chance that exhaust gasses will build up in a garage due to exhaust emanating from a remotely started vehicle, while also protecting the vehicle and contents of the garage should a remotely started vehicle not be occupied within a short time after the remote start is initiated.

BRIEF DESCRIPTION OF THE DRAWINGS

FIG. 3 is a flow chart illustrating a method of remote starting a vehicle that may be parked in a garage.

DETAILED DESCRIPTION

Figure 1:
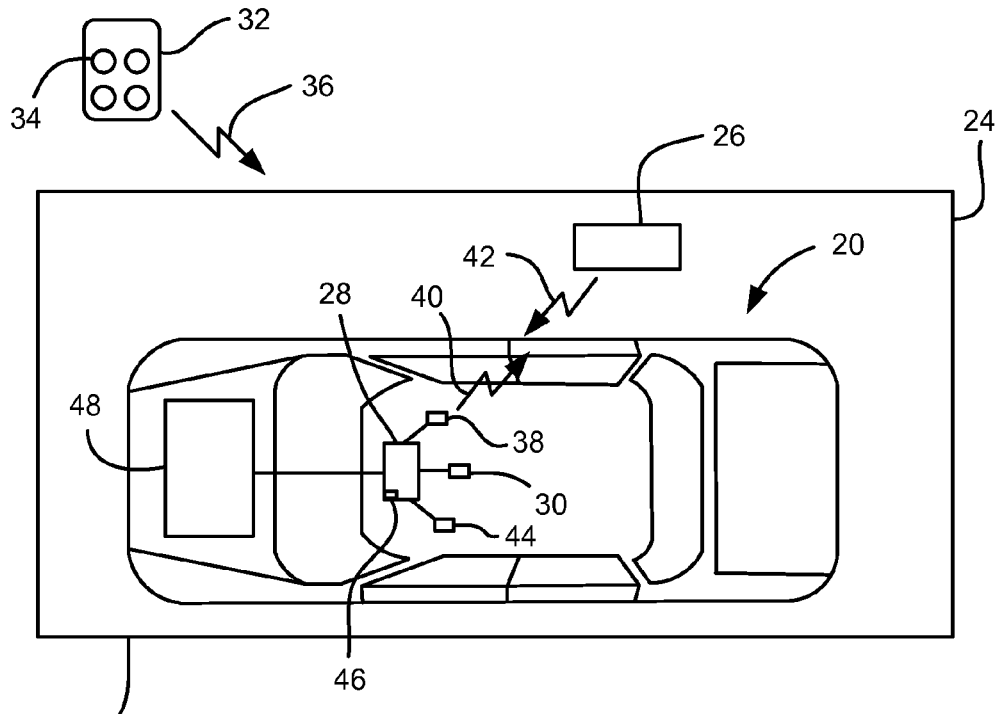
FIG. 1 shows a schematic, plan view of a vehicle parked in a garage.
Figure 2:
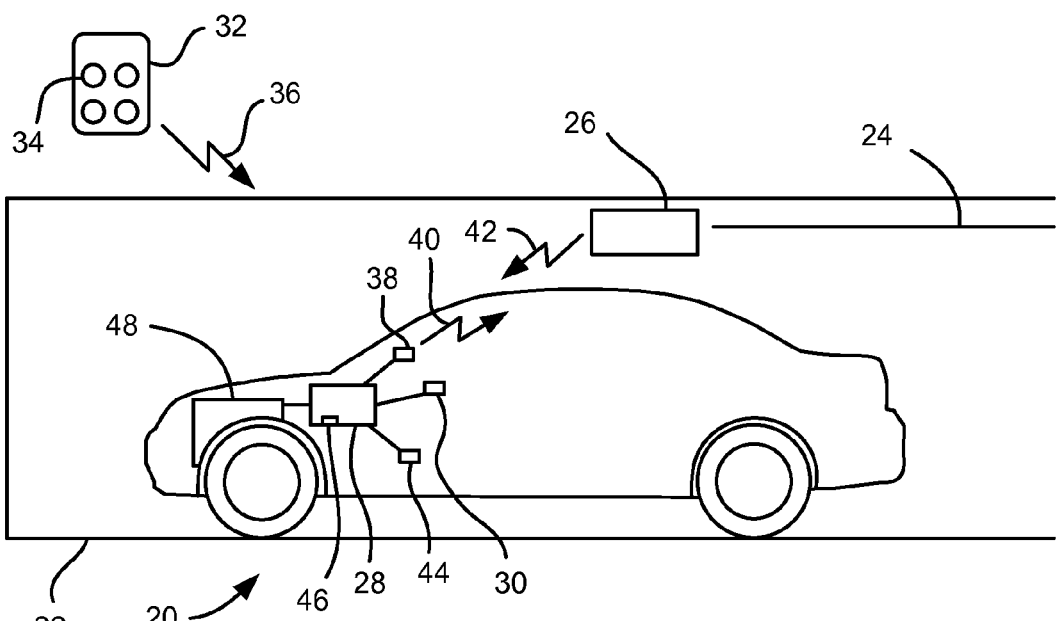
FIG. 2 shows a schematic, side elevation view of the vehicle and garage of FIG. 1.

FIGS. 1 and 2 show a vehicle 20 that is parked in a garage 22, which includes a garage door 24 that is movable between a closed position (shown in FIG. 1) and an open position (shown in FIG. 2) that allows the vehicle 20 to enter/exit the garage 22. The garage 22 includes a garage door opener 26 that can receive a signal and cause the garage door 24 to open and close.

The vehicle 20 includes a controller 28, which is sometimes called an engine control unit or a powertrain control unit. The controller 28 may made up of various combinations of hardware and software as is known to those skilled in the art. The controller 28 is in communication with a remote engine start receiver 30 (or transceiver) that receives wireless signals 36 from a key fob 32 having a remote start button 34. The controller 28 is also in communication with a garage door opener transceiver 38 that can transmit wireless signals 40 to the garage door opener 26 to cause the garage door 24 to open and close. The garage door opener 26 can also transmit a signal 42 to the transceiver 38 providing information relative to the current state (i.e., opened or closed) of the garage door 24.

The controller 28 also controls the starting and stopping of an internal combustion engine 48, either from the remote start signal 36 or an ignition user interface 44 that is in communication with the controller 28. The ignition user interface 44 may be a conventional ignition cylinder designed to accept an ignition key or may be a push button that works in conjunction with a remote user identification system, such as a card carried in a pocket of the vehicle operator. The controller 28 also includes a timer 46 that is employed to determine the length of time that the engine 48 has been running after a remote start and before the ignition user interface 44 has been actuated.

The operation of the vehicle of FIGS. 1 and 2 will now be described with respect to the flow chart of FIG. 3. Upon actuation of the remote start button 34 on the key fob 32, block 100, the remote start signal 36 is transmitted from the fob 32 and, if within range, received by the remote engine start receiver 30 in the vehicle 20. The engine start receiver 30 alerts the controller 28, block 102. Upon receiving the remote start signal 36, the controller 28 communicates, via the garage door opener transceiver 38, with the garage door opener 26 to determine the state of the garage door, block 104. If a signal 42 is received indicating that the garage door is closed, block 106, then a garage door open signal 40 will automatically be transmitted, block 108. After the garage door open signal 40 is transmitted, block 108, or if no signal 42 is received indicating that the garage door is closed, block 106, then the controller 28 proceeds with remotely starting the engine 48, block 110. The position of the garage door 24 is determined so that an open garage door will not be closed as the engine 48 is being remotely started.

When the remote starting of the engine 48 occurs, the timer 46 tracks the time from remote engine start, block 112. If the ignition user interface 44 is actuated by the vehicle operator before the timer reaches a predetermined time period, block 114, then the remote start routine ends, block 116, and the vehicle operator will have control of the vehicle 20 and garage door 24. This predetermined time period may be set to any preferred amount of time to let the vehicle run unattended, which may be, for example, five minutes. If the predetermined time period expires without actuation of the vehicle user interface 44, block 114, then the controller 28 will stop the engine, block 118. Also, if the predetermine time period expires without actuation of the vehicle user interface 44 and the garage door was automatically opened when the engine was remotely started, block 120, then the controller 28, via the garage door opener transmitter 38, will send a signal 40 to close the garage door 24, block 122. The garage door closed signal and the garage door open signal may be essentially the same type of signal transmitted from the vehicle 20, with the end result being that an open garage door 24 will be closed and a closed garage door 24 will be opened by the garage door opener 26.

While certain embodiments of the present invention have been described in detail, those familiar with the art to which this invention relates will recognize various alternative designs and embodiments for practicing the invention as defined by the following claims.

What is claimed is:

1. A method for remote starting an internal combustion engine of a vehicle comprising the steps of:
    (a) detecting a wireless remote start signal;
    (b) after detecting the wireless remote start signal, communicating with a garage door opener to determine if a garage door is closed;
    (c) remote starting the internal combustion engine if no closed garage door indication is received;
    (d) automatically transmitting a wireless garage door open signal and remote starting the internal combustion engine if a closed garage door indication is received;
    (e) monitoring a time since remote starting the internal combustion engine;
    (f) monitoring for vehicle operator interaction with the vehicle; and
    (g) if no vehicle operator interaction with the vehicle is detected before the monitored time reaches a predetermined amount of time and the wireless garage door open signal was automatically transmitted when the internal combustion engine was remote started, automatically transmitting a wireless garage door close signal and automatically turning off the internal combustion engine.

2. The method of claim 1 further comprising the step of:
    (h) if no vehicle operator interaction with the vehicle is detected before the monitored time reaches the predetermined amount of time and the wireless garage door open signal was not automatically transmitted when the internal combustion engine was remote started, automatically turning off the internal combustion engine without automatically transmitting the wireless garage door close signal.

3. The method of claim 1 wherein step (f) is further defined by the vehicle operator interaction being a vehicle operator actuating an ignition user interface.

4. The method of claim 1 further comprising the step of:
    (h) if the vehicle operator interaction with the vehicle is detected before the monitored time reaches the predetermined amount of time, preventing the automatic transmission of the wireless garage door close signal.

* * * * *